United States Patent
Wei et al.

[11] Patent Number: 5,232,003
[45] Date of Patent: Aug. 3, 1993

[54] SOFT CONTACT LENS CLEANER

[76] Inventors: Hsu C. Wei, 14F, No. 14, Sec 2, Duey Huah South Road; Cheng Wei, 5F, No. 53, Wen Fu St., Ney Fu Zone, both of Taipei, Taiwan

[21] Appl. No.: 924,804

[22] Filed: Aug. 4, 1992

[51] Int. Cl.$^5$ ............................................ B08B 3/04
[52] U.S. Cl. ................................. 134/158; 134/162; 134/901
[58] Field of Search ................. 134/901, 158, 162; 206/5.1

[56] References Cited

U.S. PATENT DOCUMENTS

| | | | |
|---|---|---|---|
| 4,907,613 | 3/1990 | Litzaw | 134/158 |
| 4,957,130 | 9/1990 | Lee | 134/901 X |

Primary Examiner—Philip R. Coe
Attorney, Agent, or Firm—Lowe, Price, LeBlanc & Becker

[57] ABSTRACT

A soft contact lens cleaner for cleaning soft contact lenses by stirring a soft contact lens cleaning solution. The cleaner includes a container which contains a soft contact lens cleaning solution, a container cap covered on the container, a rotary cap covered on the container cap to rotate a rotary plug cap, a lens holder assembly suspended from the rotary plug cap by a suspension frame inside the container. Soft cushions and gloves with raised grains are received in chambers inside the lens holder assembly and rotated by the rotary plug cap to stir the soft contact lens cleaning solution in washing and sterilizing the soft contact lenses in the lens holder assembly.

2 Claims, 5 Drawing Sheets

SOFT CONTACT LENS CLEANER

BACKGROUND OF THE INVENTION

The present invention relates to a soft contact lens cleaner for keeping and cleaning soft contact lenses.

A contact lens is a tiny, thin correctional lens worn directly over the cornea of the eye. It may be made in either soft or hard type. Because an user strongly feels the existence of a hard contact lens after it was worn over the cornea of the eye, hard contact lenses have now been replaced by soft contact lenses in the market. In using soft contact lenses, they must be regularly washed and sterilized. However, washing soft contact lenses by a cleaning solution with the hands may damage the surface of the lenses. For washing and sterilizing soft contact lenses efficiently, several motorized soft contact lens cleaning apparatus are known. However, these motorized contact lens cleaning devices are commonly expensive.

SUMMARY OF THE INVENTION

The present invention eliminates the aforesaid problems. It is therefore an object of the present invention to provide a soft contact lens cleaner which can clean and sterilize soft contact lenses effectively. It is another object of the present invention to provide a soft contact lens cleaner which has means to stir a soft contact lens cleaning solution for cleaning and sterilizing soft contact lenses efficiently. It is still another object of the present invention to provide a soft contact lens cleaner which can be used for keeping soft contact lenses. It is another object of the present invention to provide a soft contact lens cleaner which is easy to operate and inexpensive to manufacture.

According to the preferred embodiment of the present invention, a soft contact lens cleaner is generally comprised of a container which contains a soft contact lens cleaning solution, a container cap covered on the container, a rotary cap covered on the container cap to rotate a rotary plug cap, a lens holder assembly suspended from the rotary plug cap by a suspension frame inside the container. The rotary plug cap has a driving gear meshed with an annular gap on the rotary cap via two intermediate transmission gears. Soft cushions and gloves with raised grains are received in chambers inside the lens holder assembly and rotated by the rotary plug cap to stir the soft contact lens cleaning solution in washing and sterilizing the soft contact lenses in the lens holder assembly.

BRIEF DESCRIPTION OF THE DRAWINGS

FIG. 1A is a fragmentary view of a portion of the lens holder assembly.

DETAILED DESCRIPTION OF THE PREFERRED EMBODIMENT

Figure 1:
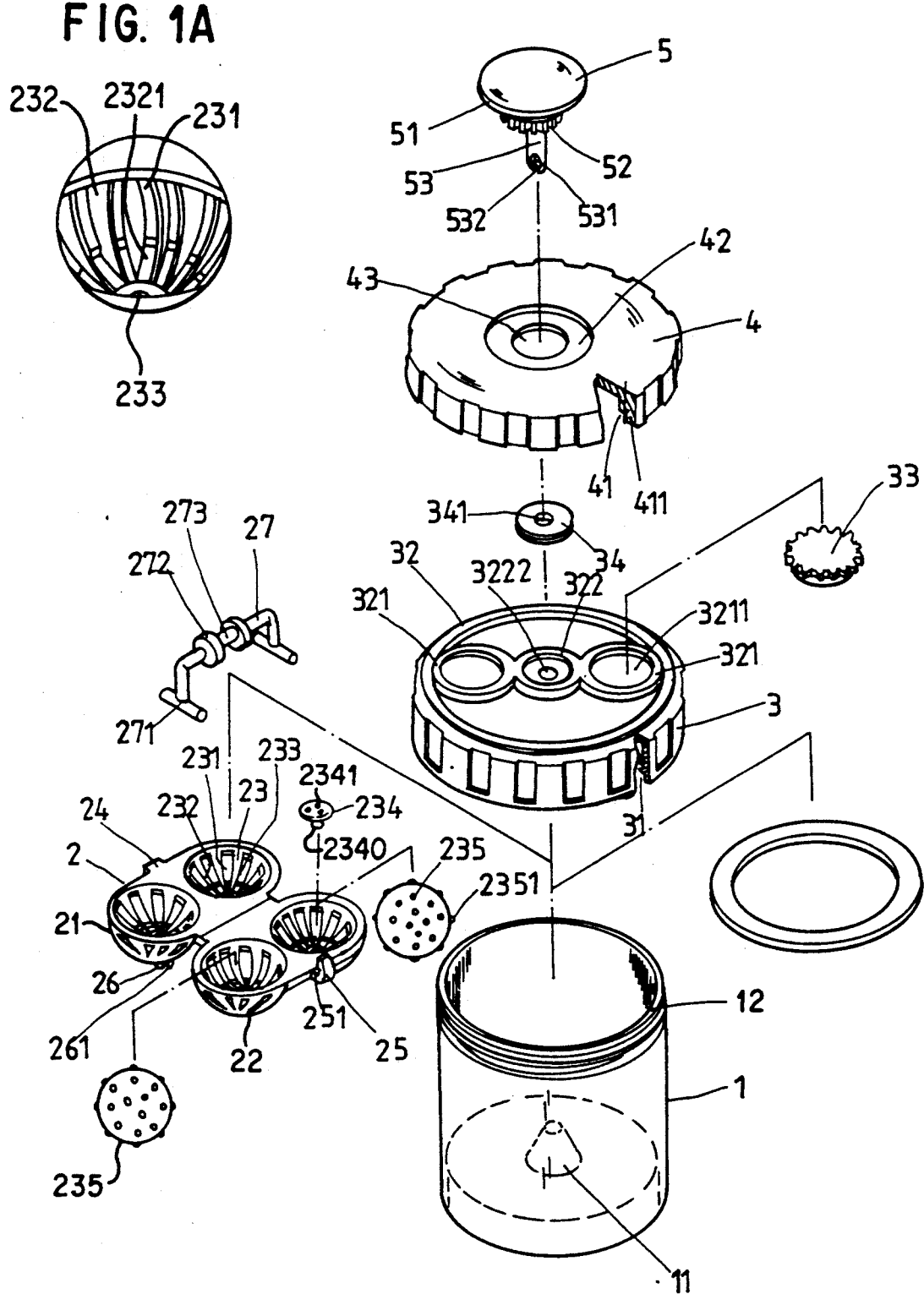
FIG. 1 is an exploded view of a soft contact lens cleaner embodying the present invention.

Referring to FIG. 1, a soft contact cleaner as constructed in accordance with the present invention is generally comprised of a container 1, a lens holder assembly 2, a container cap 3, a rotary cap 4, and a rotary plug cap 5. The container 1 comprises a cone 11 on the inside, and an outer thread 12 around the outside surface adjacent to the top edge thereof onto which the container cap 3 is fastened through a screw joint. The lens holder assembly 2 comprises a top cover 21 hinged to a bottom cover 22 on one end. The top and bottom covers 21,22 have each two circular chambers 23 on the respective bottom edge respectively curved inwards, of which each comprises a plurality of radial ribs 232, a plurality of radial slots 231 divided by the radial ribs 232 for passing a soft contact lens cleaning solution, a recessed portion 2321 on the radial ribs 232, a through hole 233 through the center, and a soft cushion 234 received in the recessed portion 2321. The soft cushion 234 has a bottom rod 2340 inserted in the through hole 233 for positioning. The soft cushion 234 has a plurality of raised grains 2341 over the outside surface. Two globes 235 are respectively received in the two circular chambers 23 of the bottom cover 22 and covered by the top cover 21. The globes 235 have each a plurality of raised grains 2351 over the outside surfaces. The top cover 21 further comprises a tongue 24 on an opposite end spaced from the bottom cover 22, which is inserted in a groove 251 on a hook 25 on the bottom cover 22 when closed, and two retainers 26 are spaced on the top edge thereof. The retainers 26 have each a retaining groove 261 which receives either suspension bar 271 on a suspension frame 27. The suspension frame 27 comprises two parallel suspension bars 271 on two opposite ends respectively fastened to the retainers 26 on the top cover 21, and a connecting rod 273 on the middle between two collars 272. The container cap 3 has an inner thread 31 meshed with the outer thread 12, an annular top flange 32 on the top around the border, two symmetrical side rings 321 and a small intermediate ring 322 abutted one another in a line within the annular top flange 32. The side rings 321 define each a circular recess 3211, which receives a respective transmission gear 33. The small intermediate ring 322 defines a circular recess 3221 therein, which receives a washer 34. The washer 34 has a center hole 341 aligned with a small through hole 3222 on the center of the circular recess 3221 of the small intermediate ring 322. The rotary cap 4 has a stepped groove 41 on the inside, which receives an annular gear 411, a circular recess 42 on the top edge thereof, and a through hole 43 through the center of the circular recess 42. The rotary plug cap 5 has a driving gear 52 on the bottom of the cap body 51 thereof in horizontal direction, and a plug rod 53 extended downwards from the center of the gear 52. The gear plug rod 53 of the rotary plug cap 5 has a terminal end formed into a transverse axle hole 531 extended to the outside through a narrow gap 532.

Figure 2:
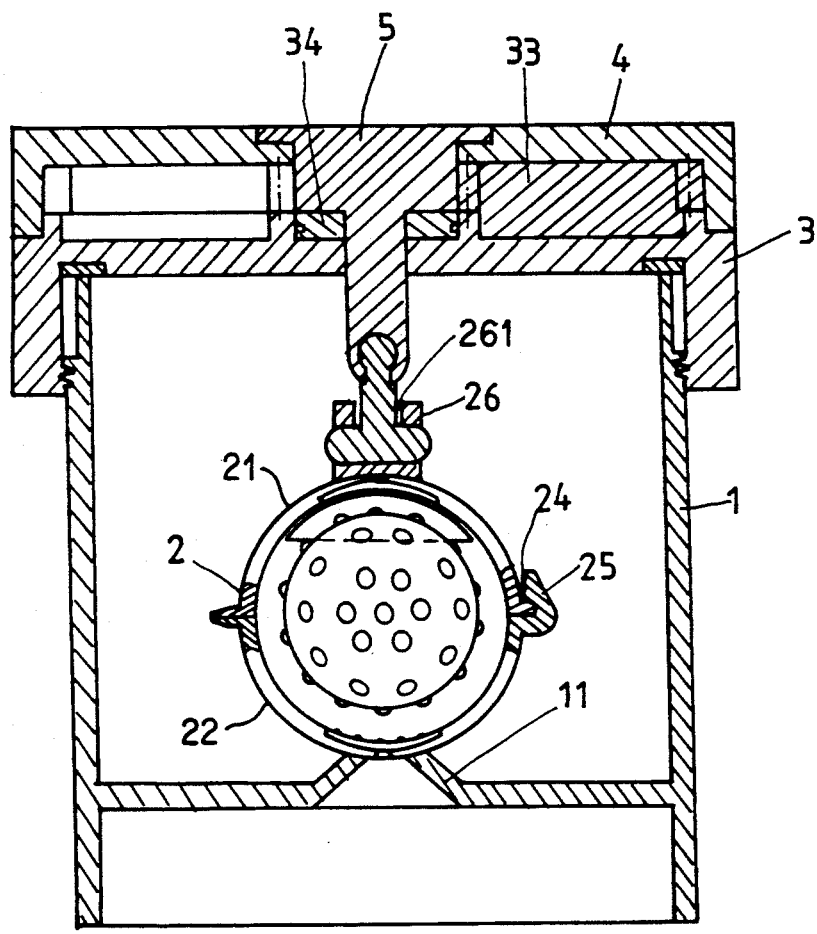
FIG. 2 is a side sectional view of the soft contact lens cleaner.
Figure 3:
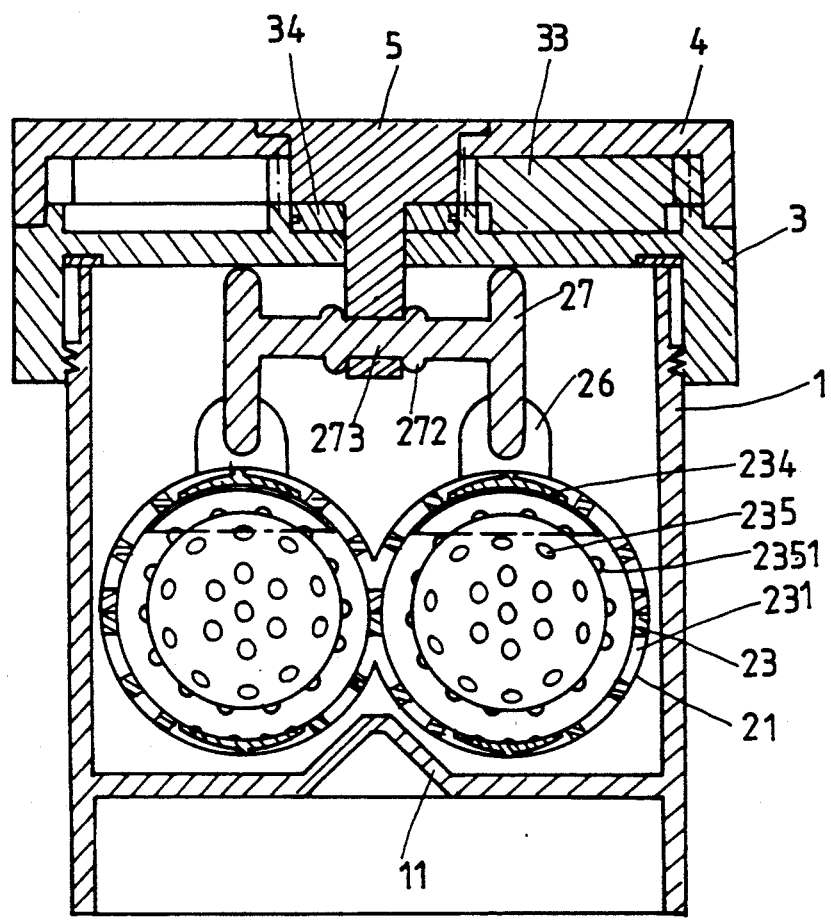
FIG. 3 is a top sectional view of the soft contact lens cleaner.
Figures 4, 4A:
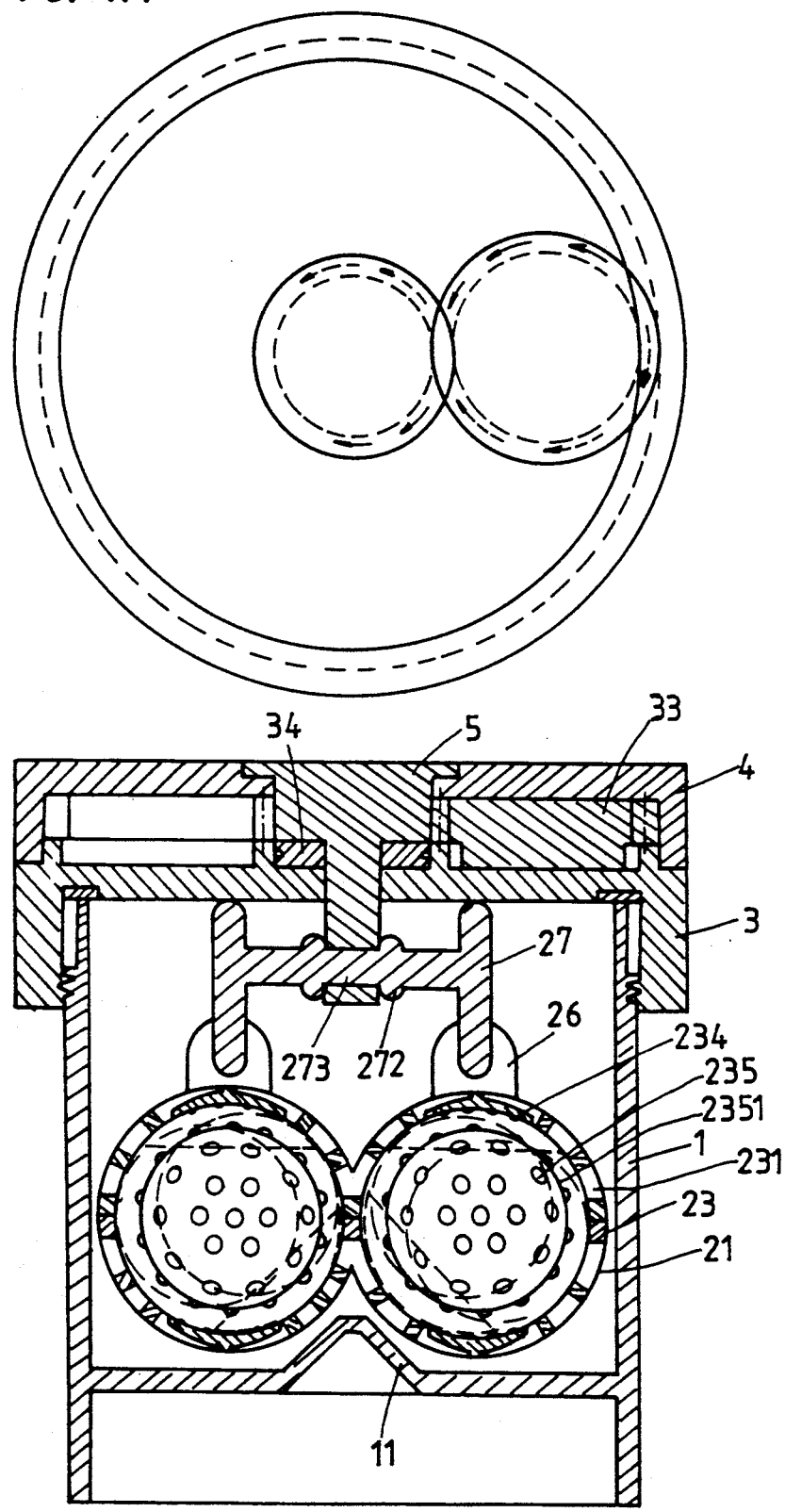
FIG. 4 is a top plan view of the soft contact lens cleaner.
FIG. 4A is a top schematic view of the rotating mechanism in the container cap and rotary cap.

Referring to FIGS. 2, 3 and 4, the transmission gears 33 and the washer 34 are respectively put in the circular recesses 3211 of the side rings 321 and the circular recess 3221 of the small intermediate ring 322, then the plug rod 53 of the rotary plug cap 5 is inserted through the through hole 43 on the rotary cap 4, the center hole 341 on the washer 34 and the small through hole 3222 on the small intermediate ring 322 of the container cap 3 with the cap body 51 tightly receives in the circular recess 42 on the rotary cap 4 permitting the connecting rod 273 to be fastened in the axle hole 531 on the plug rod 53. After the soft cushions 234 and the globes 235 have been respectively received in the lens holder assembly 2, the lens holder assembly 2 is attached to the suspension frame 27, and then the container cap 3 is fastened to the container 1. When assembled, the lens holder assembly 2 is suspended from the plug rod 53 of the rotary plug cap 5 by the suspension frame 27 and supported on the cone 11 inside the container; the transmission gears 33 are respectively meshed between the annular gear 411 on the rotary cap 4 and the driving gear 52 on the rotary plug cap 5.

Figure 5:
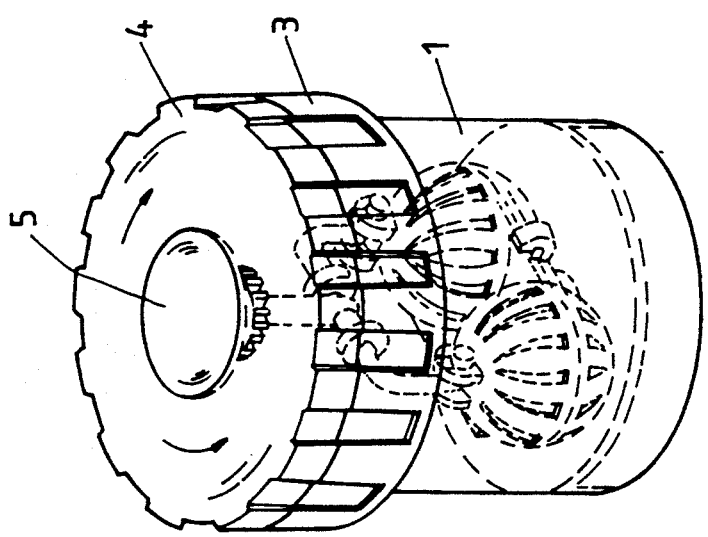
FIG. 5 is a perspective view of the soft contact lens cleaner.

Referring to FIG. 5 and seeing FIG. 4 again, the operation of the present invention is outlined hereinafter. Soft contact lenses 6 are respectively received in the chambers 23 inside the lens holder assembly 2. A prepared soft contact lens cleaning solution is filled in the container 1 over the level of the lens holder assembly 2. After the container 1 has been sealed by the container cap 3, rotate the rotary cap 4 in either direction to turn the lens holder assembly 2 in the soft contact lens cleaning solution. While rotating, the raised grains 2341, 2351 on the soft cushions 234 and the globes 235 are moved in to stir up the soft contact lens cleaning solution in washing and sterilizing the soft contact lenses.

What is claimed is:

1. A soft contact lens cleaner comprising a cylindrical container having an open top and closed bottom to contain a soft contact lens cleaning solution, a container cap threadedly fastened to said container to seal said open top thereof, said container cap having an axial opening therethrough, a rotary cap rotatably mounted on said container cap, a rotary plug extending through the opening in said container cap, a lens holder assembly suspended inside said container and coupled to said plug and means coupled said plug and rotary cap for rotating said plug and lens assembly responsive to rotation of said rotary cap, said lens holder assembly comprising a top cover and a bottom cover, said covers being hingedly interconnected and defining two circular chambers therein, two globes respectively received in the circular chambers in said top and bottom covers, said circular chambers each defined by a plurality of radial ribs and a plurality of radial slots divided by said radial ribs and formed by said top and bottom covers for admitting soft contact lens cleaning solution into the chambers, said top cover having a tongue on an end opposite the hinge interconnection with said bottom cover and a hook on said bottom cover adjacent the tongue for releasably connecting said covers; a suspension frame connecting said holder assembly and plug comprising two parallel suspension bars respectively fastened to said top cover, and a connecting rod fastened between said bars and said rotary plug cap; whereby rotating said rotary cap causes said rotary plug to rotate said lens holder assembly in the soft contact lens cleaning solution when said solution is disposed in said container so that when soft contact lenses are received in the chambers on said lens holder assembly they can be washed and sterilized by the soft contact lens cleaning solution.

2. The soft contact lens cleaning according to claim 1, wherein globes each have a plurality of raised grains over the respective outside surface thereof for stirring the soft contact lens cleaning solution.

* * * * *